United States Patent [19]
Anabuki

[11] Patent Number: 6,091,518
[45] Date of Patent: Jul. 18, 2000

[54] IMAGE TRANSFER APPARATUS, IMAGE TRANSMITTER, PROFILE INFORMATION TRANSMITTER, IMAGE RECEIVER/REPRODUCER, STORAGE MEDIUM, IMAGE RECEIVER, PROGRAM TRANSMITTER, AND IMAGE COLOR CORRECTION APPARATUS

[75] Inventor: Tetsushi Anabuki, Ebina, Japan

[73] Assignee: Fuji Xerox Co., Ltd., Tokyo, Japan

[21] Appl. No.: 08/882,098

[22] Filed: Jun. 25, 1997

[30] Foreign Application Priority Data

Jun. 28, 1996 [JP] Japan .................................... 8-169690

[51] Int. Cl.$^7$ .............................. H04N 1/46; H04N 1/32; G03F 3/08
[52] U.S. Cl. ........................... 358/500; 358/442; 358/518
[58] Field of Search .................................... 358/500, 518, 358/527, 529, 442, 468, 1.1, 1.6, 1.15, 1.13

[56] References Cited

U.S. PATENT DOCUMENTS

| | | | |
|---|---|---|---|
| 5,349,452 | 9/1994 | Maeda et al. ............................ | 358/527 |
| 5,720,013 | 2/1998 | Uda et al. ................................ | 395/114 |
| 5,754,184 | 5/1998 | Ring et al. ............................... | 395/109 |
| 5,754,774 | 5/1998 | Bittinger et al. .................... | 395/200.33 |
| 5,781,909 | 7/1998 | Logan et al. ............................ | 707/200 |
| 5,793,414 | 8/1998 | Shaffer ..................................... | 348/13 |
| 5,815,642 | 9/1998 | Kumada .................................. | 395/109 |
| 5,822,507 | 10/1998 | Uda et al. ................................ | 395/114 |
| 5,835,243 | 11/1998 | Mori ....................................... | 358/518 |
| 5,933,580 | 8/1999 | Uda et al. ............................... | 395/112 |

FOREIGN PATENT DOCUMENTS

| | | |
|---|---|---|
| 579224 | 1/1994 | European Pat. Off. . |
| 6-038032 | 2/1994 | Japan . |
| 7-203175 | 8/1995 | Japan . |
| 7-312694 | 11/1995 | Japan . |

*Primary Examiner*—Kimberly A. Williams
*Attorney, Agent, or Firm*—Oliff & Berridge, PLC

[57] ABSTRACT

An image transfer apparatus cooperates with an image reception and reproduction means to reduce network burden while transferring profile information. Specifically, a profile storage device is connected to a network. The profile storage device stores profile information for a color correction made to color image information on color image information prepared from object information. An image transmission device transmits profile specification information specifying the profile information corresponding to the color image information or the object information together with the color image information or the object information. A receiving device receives the color image information or the object information and the profile specification information transmitted by the image transmission means. A call device requests profile information specified by the profile specification information received by the reception device from the profile storage device. A color correction device then uses the profile information to make a color correction in the color image information or color image information prepared from the object information. A reproducing device then reproduces the color corrected color image information.

15 Claims, 15 Drawing Sheets

HTML NOTATION EXAMPLE

```
<HTML>
<BODY COLORSPACE="RGB" PROFILE="fille://ftp. xx
xxx. co. jp/pub/profile/fx-std-rab.prf" TEXT="#F0000">
. . . . .
. . . . .
<FONT COLOR= "#00FF00">
. . . . .
. . . . .
</FONT>
. . . . .
. . . . .
<IMG SRC="portrait. img">
. . . . .
. . . . .
<IMG SRC="digital-x.img" COLORSPACE="CMYK" PRO
FILE="fille://ftp.xxxxx.co. jp/pub/profile/xxxxx-logo.prf">
. . . . .
. . . . .
<BLOCK COLORSPACE="CMYK" PROFILE="fille://ftp.
xxxxx.com/pub/profile/swop.prf" TEXT="#FF000000">
. . . . .
. . . . .
<IMG SRC="swopn1.img">
. . . . .
. . . . .
</BLOCK>
. . . . .
. . . . .
</BODY>
</HTML>
```

FIG.5

IMAGE TRANSFER APPARATUS, IMAGE TRANSMITTER, PROFILE INFORMATION TRANSMITTER, IMAGE RECEIVER/ REPRODUCER, STORAGE MEDIUM, IMAGE RECEIVER, PROGRAM TRANSMITTER, AND IMAGE COLOR CORRECTION APPARATUS

BACKGROUND OF THE INVENTION

This invention relates to color image transfer techniques for distributing or transferring a color image and an object for preparing a color image over a network and in particular to an image transfer apparatus, an image transmitter, a profile information transmitter, an image receiver/ reproducer, a storage medium, an image receiver, a program transmitter, and an image color correction apparatus which enable a receiving party to display an image with original image colors held.

As information processing and communication technologies have become advanced, various techniques for connecting various devices for handling color image information, such as scanners, facsimiles, and color printers, and transferring color images between the devices have been proposed.

By the way, the transferred color image is reproduced by reproduction means such as a display device of the receiving party. At the time, the characteristics of the image input device at the transmitting party (for example, a scanner) do not necessarily match those of the reproduction means at the receiving party (for example, a color printer), thus it becomes necessary to execute color conversion in the color image transfer process.

Disclosed as one of the color conversion techniques, for example, in the Unexamined Japanese Patent Application Publication Nos. Hei 7-203175 and 7-312694 is a technique wherein the transmitting party has a color conversion function and the receiving party transfers profile information to the transmitting party, which then executes color conversion and transmits the resultant image to the receiving party, which will be hereinafter referred to as first prior art. The profile information is information defining the characteristics of a color space used to describe colors used in color image information; generally, color spaces defined based on perception of human beings, such as CIE XYZ and CIE L*a*b*, and information describing the mathematical relationship between the color spaces of color image information are used. In addition to the first prior art, a technique wherein the receiving party has a color conversion function and the transmitting party transfer profile information and an image to the receiving party, which then executes color conversion, which will be hereinafter referred to as second prior art, is disclosed in the Unexamined Japanese Patent Application Publication No. Hei 7-312694.

By the way, to apply the conventional techniques described above to an image transfer apparatus using a large-scale network environment such as the Internet, an undesired situation occurs on efficiency of communication lines or administration of the system. That is, if the first prior art is applied, the color conversion function at the transmitting party must deal with color conversion requests from a large number of receivers. Thus, the transmitting party requires a large processing capability and if it has an insufficient processing capability, processing takes time. On the other hand, if the second prior art is applied, when the receiving party receives images from a number of transmitters, even if the received images have the same color space, profile information needs to be transmitted each time the transmitting party changes. Thus, fruitless communication becomes necessary and efficient use of the communication line capacity cannot be made. If either of the first and second prior arts is applied, it becomes necessary to transfer profile information between the transmitting and receiving parties each time one image transfer is executed. Thus, it cannot be avoided to bear the communication costs to transfer the profile information.

SUMMARY OF THE INVENTION

It is therefore an object of the invention to provide an image transfer apparatus, an image transmitter, a profile information transmitter, and an image receiver/reproducer whereby color image information or object information for preparing color image information can be transferred without putting a large load on a specific transmitter or executing fruitless communication and the receiving party can reproduce an image with original image colors held.

Means for solving the problems will be discussed with reference to FIG. 1.

First, an image transfer apparatus of aspect 1 is provided according to the configuration shown in FIG. 1 and comprises:

a profile server 1 being connected to a network for storing profile information for a color correction made to color image information or color image information prepared from object information and outputting profile information in response to a call from an image display device 3 (described later);

an image server 2 (image transmission means) for transmitting profile specification information specifying the profile information corresponding to the color image information or the object information together with the color image information or the object information;

an image display device 3 (image reception and reproduction means) comprising reception means 30 for receiving the color image information or the object information and the profile specification information transmitted by the image transmission means, call means 34 for calling profile information specified by the profile specification information received by the reception means from the profile storage means, color correction means 35 using the profile information for making a color correction to the color image information or color image information prepared from the object information, and reproduction means 36 for reproducing the color image information to which a color correction has been made by the color correction means.

According to the image transfer apparatus, the image server 2 is released from the load for transferring profile information itself as well as the color correction load and can raise processing efficiency accordingly. Since the profile information itself is not transferred, congestion of the communication line connected to the image server 2 can be relieved. On the other hand, the image display device 3 can receive necessary profile information from the profile server 1 based on the profile specification information provided by the image server 2, so that an image color correction can be made without a hitch.

The profile information may be information defining a color space used to describe the color image information or color image information prepared from the object information. (Aspect 2)

The profile specification information may be any if it can specify necessary profile information; preferably, it is location information specifying a location of storage means on the network where the profile information exists and a storage location of the profile information in the storage means for the image display device 3 to obtain necessary profile information promptly. (Aspect 3)

The invention of aspects 4 to 7 provides main components making up the image transfer apparatus.

That is, an image transmitter of aspect 4, which is provided as the image server 2 in FIG. 1, comprises transmission means 20 for transmitting through a network, color image information or object information for preparing color image information and profile specification information (location information in the example in FIG. 1) specifying profile information for a color correction made to the color image information or color image information prepared from the object information.

A profile information transmitter of aspect 5, which is provided as the profile server 1 in FIG. 1, comprises profile storage means 10 for storing profile information for a color correction made to color image information or color image information prepared from object information; and communication control means 11 for transmitting the profile information to a calling party when the profile information is called through a network.

An image receiver/reproducer of aspect 6, which is provided as the image display device 3 in FIG. 1, comprises reception means 30 for receiving color image information or object information for preparing color image information and profile specification information specifying profile information for a color correction made to the color image information or color image information prepared from the object information, sent through a network;

call means 34 for calling through the network, profile information corresponding to the profile specification information received by the reception means;

color correction means 35 using the profile information for making a color correction to the color image information or color image information prepared from the object information; and reproduction means 36 for reproducing the color image information to which a color correction has been made by the color correction means.

The invention of aspect 7 introduces the so-called cache storage technique for raising the processing efficiency of the image reproducer 3. That is, as shown in FIG. 1, the image display device 3 comprises:

reception means 30 for receiving color image information or object information for preparing color image information and profile specification information (location information in the example in FIG. 1) specifying profile information for a color correction made to the color image information or color image information prepared from the object information, sent through a network;

registration means 31 for registering profile information received through the network together with the profile specification information for specifying the profile information;

determination means 32 for determining whether or not the same information as the profile specification information received by the reception means is registered in the registration means;

getting means 33 for getting profile information corresponding to the profile specification information from the registration means if a determination that the same information as the profile specification information received by the reception means is registered in the registration means is obtained from the determination means;

call means 34 for calling profile information through the network if a determination that the same information as the profile specification information received by the reception means is not registered in the registration means is obtained from the determination means;

color correction means 35 using the profile information obtained by the getting means or the call means for making a color correction to the color image information or color image information prepared from the object information; and reproduction means 36 for reproducing the color image information to which a color correction has been made by the color correction means.

According to the image display device 3, only if new profile specification information not received in the past is received, the corresponding profile information is called through the network. If the same information as already received profile specification information is received, the profile information received in the past is reused. Therefore, the frequency calling profile information through the network can be lessened, fruitless communication can be prevented, and the processing efficiency of the image display device 3 can be raised.

According to the invention of aspect 8, as shown in FIG. 11, there is provided a storage medium 501 for storing data accessed by a program executed by a computer 500 and having a predetermined data structure in a format that can be input to the computer, the storage medium for storing color image information 503 or object information 502 for preparing color image information and profile specification information 505 for specifying profile information 504 for a color correction made to the color image information 503 or color image information prepared from the object information 502 in relation to each other. In this case, the profile specification information 505 is read into the computer 500 for interpretation, whereby the profile information 504 is specified through the network NT.

The storage medium 501 causes a change state of energy of magnetism, light, electricity, etc., in response to the program description contents for a reader provided as a hardware resource of the computer and can transfer the program description contents to the reader in the form of signal responsive to the energy change state. For example, as shown in FIG. 11, the storage medium is a magneto-optic disk 501a, 501b, an optical disk (CD-ROM, etc.,) 501c, a magnetic disk 501d, a memory 501e contained in the computer, or the like. In the specification, the "storage medium" is used to mean the same.

An image receiver of aspect 10 comprises reception means 511 for receiving image relevant information 506 consisting of color image information 503 or object information 502 for preparing color image information and profile specification information 505 for specifying profile information 504 for a color correction made to the color image information or color image information prepared from the object information, and storage means 512 for storing the image relevant information 506 received by the reception means 511, as shown in FIG. 14.

In this case, the image receiver 510 can read and use the image relevant information 506 stored in the storage means 512 appropriately, whereby the profile information 504 can be specified, thus an image can be reproduced with the original image colors held.

A program transmitter of aspect 11 comprises storage means 551 for storing a program 550 for causing a computer to perform a step of receiving color image information or object information for preparing color image information and profile specification information specifying profile information for a color correction made to the color image information or color image information prepared from the object information, sent through a network NT, a step of calling profile information corresponding to the profile specification information received in the reception step, a color correction step of using the profile information called in the call step for making a color correction to the color image information or color image information prepared from the object information, and a step of reproducing the color image information to which a color correction has been made in the color correction step, and transmission means 552 for reading the program 550 stored in the storage means 551 and transmitting the program 550, as shown in FIG. 12. The program 550 executes the processing contents like the flowchart shown in FIG. 16, for example. First, a combination of the color image information and the profile specification information is received at step Sc1 shown in FIG. 16. Next, the profile specified by the profile specification information received at step Sc1 is called at step Sc2 and is received at step Sc3. The received profile is stored at step Sc4, an image color correction is made based on the stored profile at step Sc5, and an image resulting from the color correction is output at step Sc6.

A storage medium of aspect 12 stores a program for causing a computer to perform a step of receiving color image information 503 or object information 502 for preparing color image information and profile specification information 505 specifying profile information 504 for a color correction made to the color image information or color image information prepared from the object information 502, sent through a network NT as shown in FIG. 14, a step of calling profile information 504 corresponding to the profile specification information 505 received in the reception step, a color correction step of using the profile information 504 called in the call step for making a color correction to the color image information 503 or color image information prepared from the object information 502, and a step of reproducing the color image information to which a color correction has been made in the color correction step, in a format that can be input to the computer. The program becomes as shown in FIG. 16.

An image color correction apparatus of aspect 13 comprises storage means 521 for storing object specification information 520 specifying color image information 503 or object information 502 for preparing color image information and profile specification information 505 for specifying profile information 504 for a color correction made to the color image information 503 or color image information prepared from the object information 502 specified by the object specification information 520 in relation to each other, first call means 525 for calling the color image information 503 or object information 502 corresponding to the object specification information 520 stored in the storage means 521, second call means for calling the profile information corresponding to the profile specification information stored in the storage means in relation to the color image information or object information called by the first call means, and color correction means 530 using the profile information called by the second call means for making a color correction to the color image information or color image information prepared from the object information called by the first call means, as shown in FIG. 15.

A storage medium of aspect 14 stores a program P for causing a computer to perform a step of storing object specification information 520 specifying color image information 503 or object information 502 for preparing color image information and profile specification information for specifying profile information for a color correction made to the color image information 503 or color image information prepared from the object information 502 specified by the object specification information 520 in relation to each other, a first call step of calling the color image information 503 or object information 502 corresponding to the object specification information 520 stored in the storage step, a second call step of calling the profile information 504 corresponding to the profile specification information 505 stored in the storage step in relation to the color image information 503 or object information 502 called in the first call step, and a color correction step of using the profile information 504 called in the second call step for making a color correction to the color image information 503 or color image information prepared from the object information 502 called in the first call step, in a format that can be input to the computer. The program P is recorded on media 501a–501e as shown in FIG. 13 and is as shown in the flowchart in FIG. 17; it is a program for accomplishing the image color correction apparatus shown in FIG. 15.

In the flowchart shown in FIG. 17, first the object specification information and the profile specification information are stored in relation to each other at step Sd1. The color image information specified by the object specification information is called at step Sd2 and the profile specified by the profile specification information is called at step Sd3. Next, a color correction is made to the color image information based on the profile at step Sd4.

A program transmitter of aspect 15 comprises storage means 551 for storing a program P for causing a computer to perform a step of storing object specification information specifying color image information or object information for preparing color image information and profile specification information for specifying profile information for a color correction made to the color image information or color image information prepared from the object information specified by the object specification information in relation to each other, a first call step of calling the color image information or object information corresponding to the object specification information stored in the storage step, a second call step of calling the profile information corresponding to the profile specification information stored in the storage step in relation to the color image information or object information called in the first call step, and a color correction step of using the profile information called in the second call step for making a color correction to the color image information or color image information prepared from the object information called in the first call step, in a format that can be input to the computer, and transmission means 552 for reading the program P stored in the storage means 551 and transmitting the read program, as shown in FIG. 12. The program P becomes as shown in the flowchart in FIG. 17; it is a program for accomplishing the image color correction apparatus shown in FIG. 15.

BRIEF DESCRIPTION OF THE DRAWING

FIG. 5 is an illustration to show an extended notation example of HTML in the second embodiment of the invention;

DETAILED DESCRIPTION OF THE PREFERRED EMBODIMENTS

Referring now to the accompanying drawings, there are shown preferred embodiments of the invention.

A. First Embodiment

Figure 1:
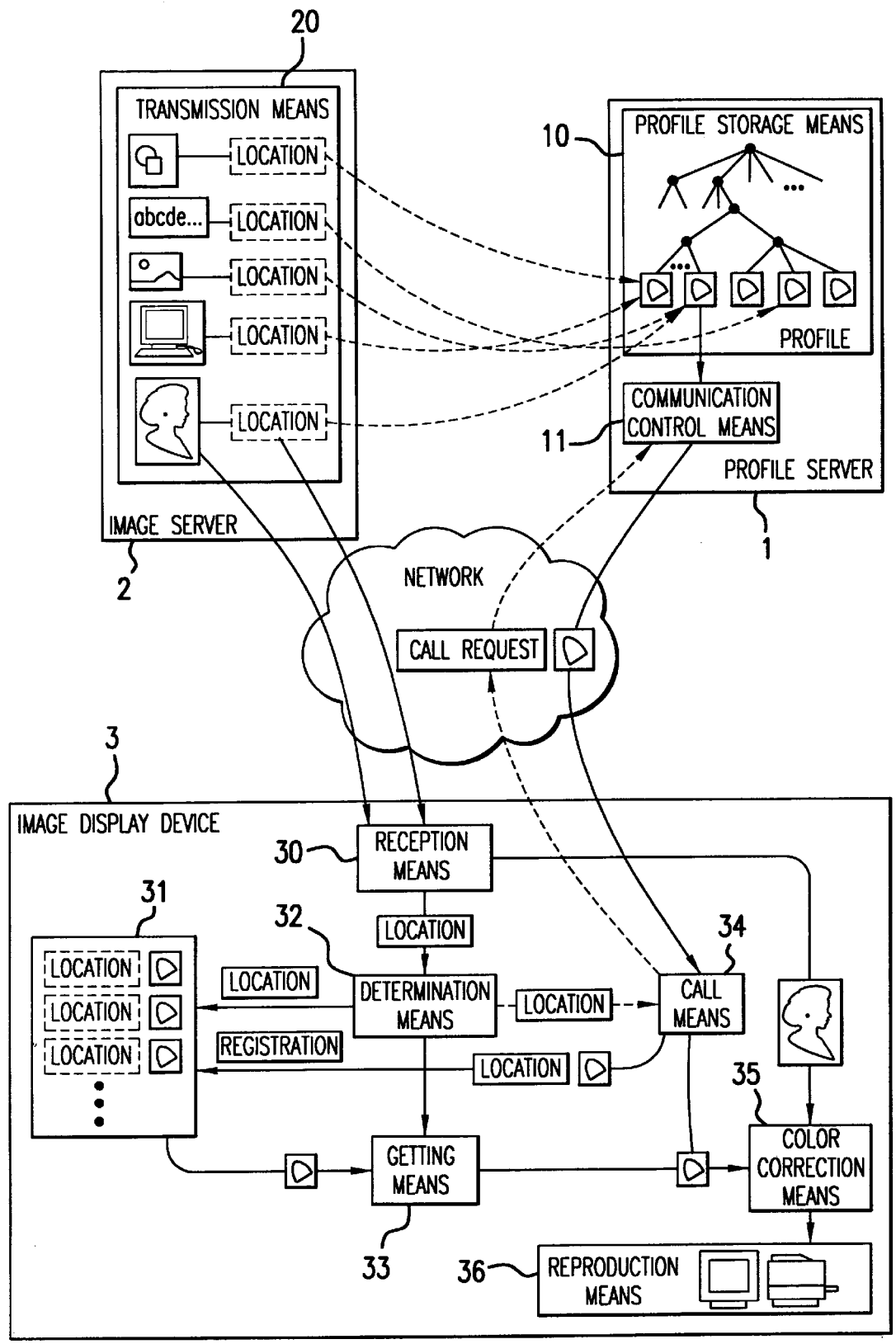
FIG. 1 is an illustration to show the basic configuration of the invention.
Figure 2:
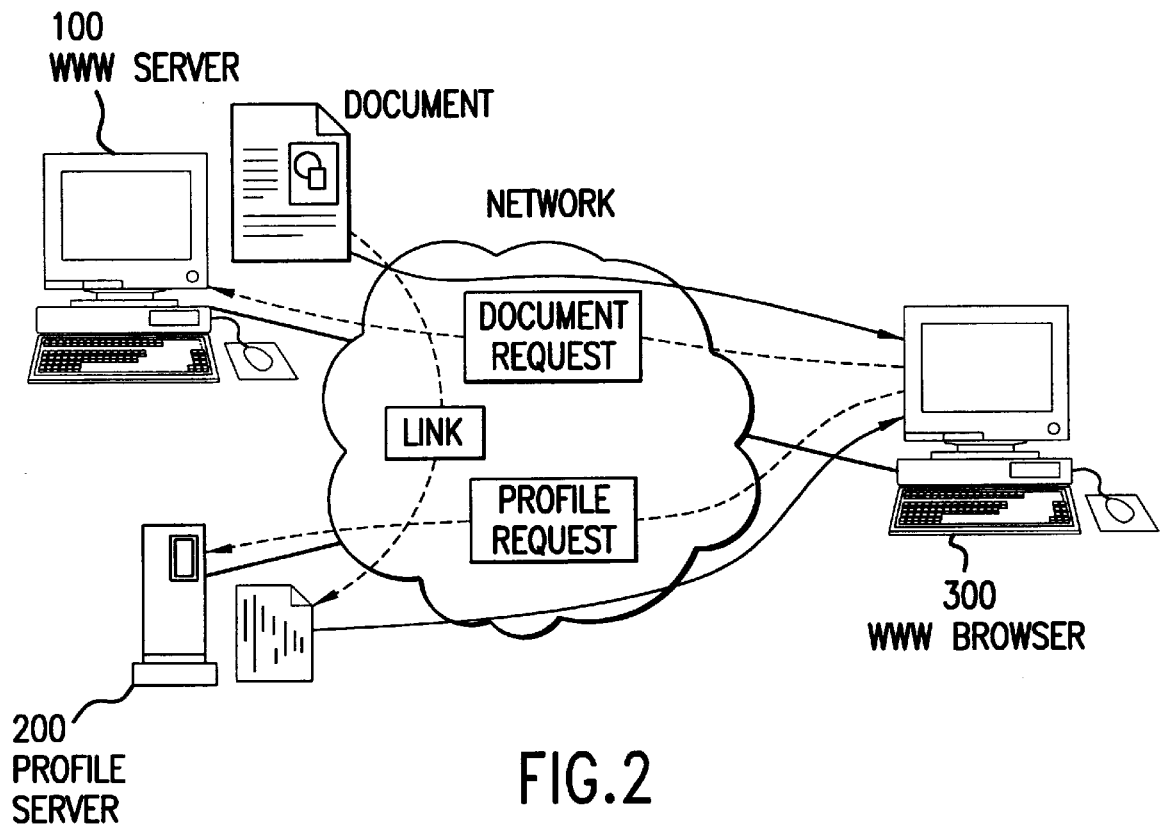
FIG. 2 is an illustration to show the configuration of an image transfer apparatus of a first embodiment of the invention.
Figure 3:
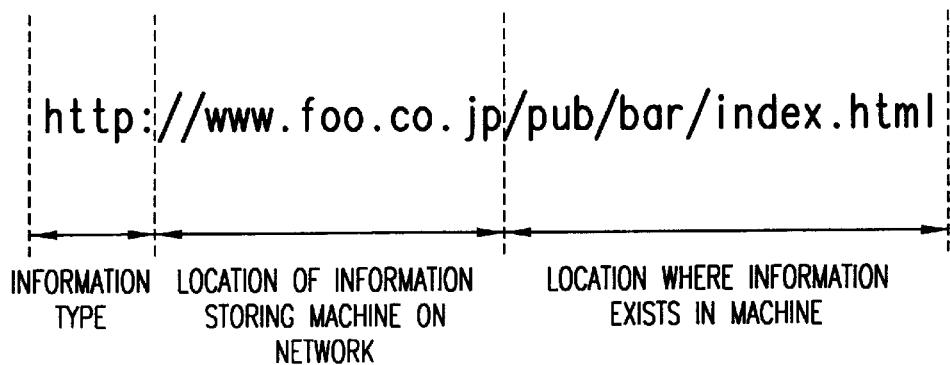
FIG. 3 is an illustration of the contents of a URL used in the first embodiment of the invention.

FIG. 2 is an illustration to show the configuration of a color image transfer apparatus of a first embodiment of the invention. The first embodiment is provided by applying the invention to a distributed information system World Wide Web (WWW) widely used in various network environments including the Internet.

The WWW is made up of devices called servers for providing documents through a network and devices called browsers for receiving the documents from the servers and displaying them in a format that can be understood by human beings. For example, an extremely large number of servers and browsers exist in a large-scale network such as the Internet. The servers and the browsers often are installed as computers in which software products for executing their functions are built.

The documents provided by the WWW server are described in the notation of an HTML (hyper text markup language). The HTML is a technique wherein tags indicating a document structure, a document display method, locations of images, moving pictures, voice, objects, programs, etc., embedded in the document, a link pointing to another document, and the like are embedded in the text document, thereby making up the document; it enables multimedia documents to be prepared and documents stored in different files and servers to be related to each other.

Here, general WWW operation will be discussed. First, to command the browser to display an HTML document existing in one server, the user gives the address at which the HTML document exists in the format called a URL (universal resource location) to the browser. The URL is defined in the notation having a combination of three entries of the information type, the location of the machine storing the information on the network, and the location where the information exists in the machine. This URL enables unique specification of the location of information in the network. The browser finds out the location where the HTML document exists from the URL specified by the user and requests the server storing the document to transmit the HTML document and the data embedded in the document. Such data includes images, moving pictures, voice, objects, programs, etc. When receiving the request from the browser, the server returns the requested HTML document and data to the browser. Upon reception of the HTML document and data, the browser analyzes the HTML document, converts the document into the format that can be understood with eyes of human beings, and displays the result on a display device such as a CRT or a printer.

As described above, a link pointing to another document is embedded in the HTML document. This link is also represented as a URL. If the user commands the browser to display the document pointed to by the link with means such as a pointing device, the browser finds out the location of the new document from the URL and calls the document from the server storing the document. Documents can be thus traced in order across a number of servers.

By the way, in existing WWWs, when colors are represented in HTML documents and images, the color space difference for each device is not considered and the color space is assumed to be an RGB space of a display device for representing colors. Thus, there is a disadvantage in that the display colors differ depending on the display device used by the browser.

A technique called a CMS (color management system) is available to prevent such display color difference from occurring. In this technique, profile information describing the mathematical relationship between the color space used for documents and images and the color space defined based on perception of human beings, such as CIE XYZ or CIE L*a*b*, is added to documents and images. To display a document or an image, an algorithm is prepared for converting the document or image color space into the display device color space from the profile added to the document or the image and the information describing the color characteristics of the display device, and is used to convert the document or image colors. In doing so, the document or image can be displayed in the colors at the preparation time regardless of the display device.

However, the documents or images prepared in the same environment (for example, the images read through the same scanner) generally use the same color space, thus the number of profile types is fewer by far than the total number of documents or images transferred in the network. However, if profiles are simply added to documents and images in the network environment, as many identical profiles as documents and images using the same color space are transmitted; resultantly, fruitless communication occurs. Particularly to raise accuracy of color correction, the profile data amount increases, thus the fruitless communication amount also grows.

Figure 12:
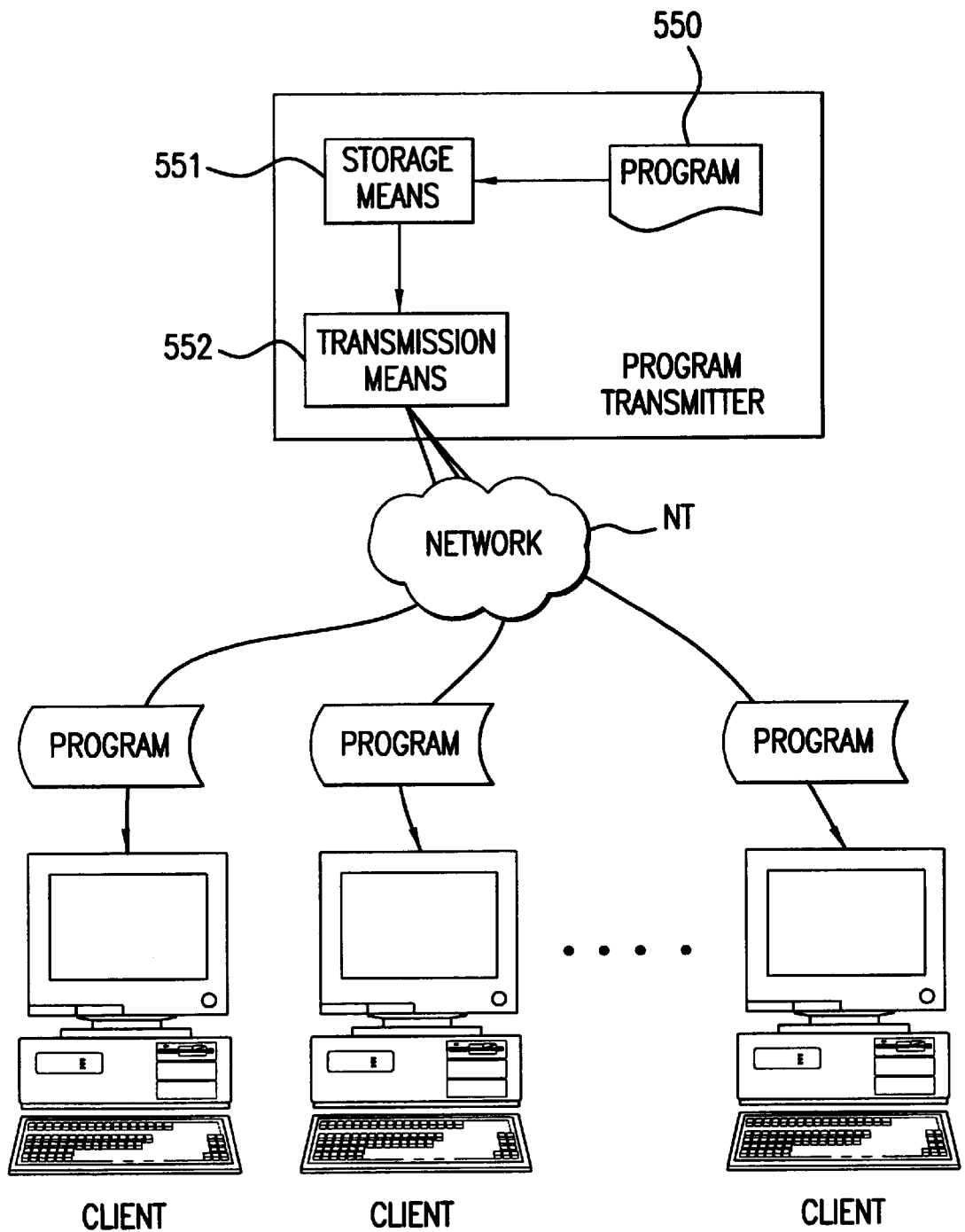
FIG. 12 is an illustration to show how a program is stored on storage media.
Figure 13:
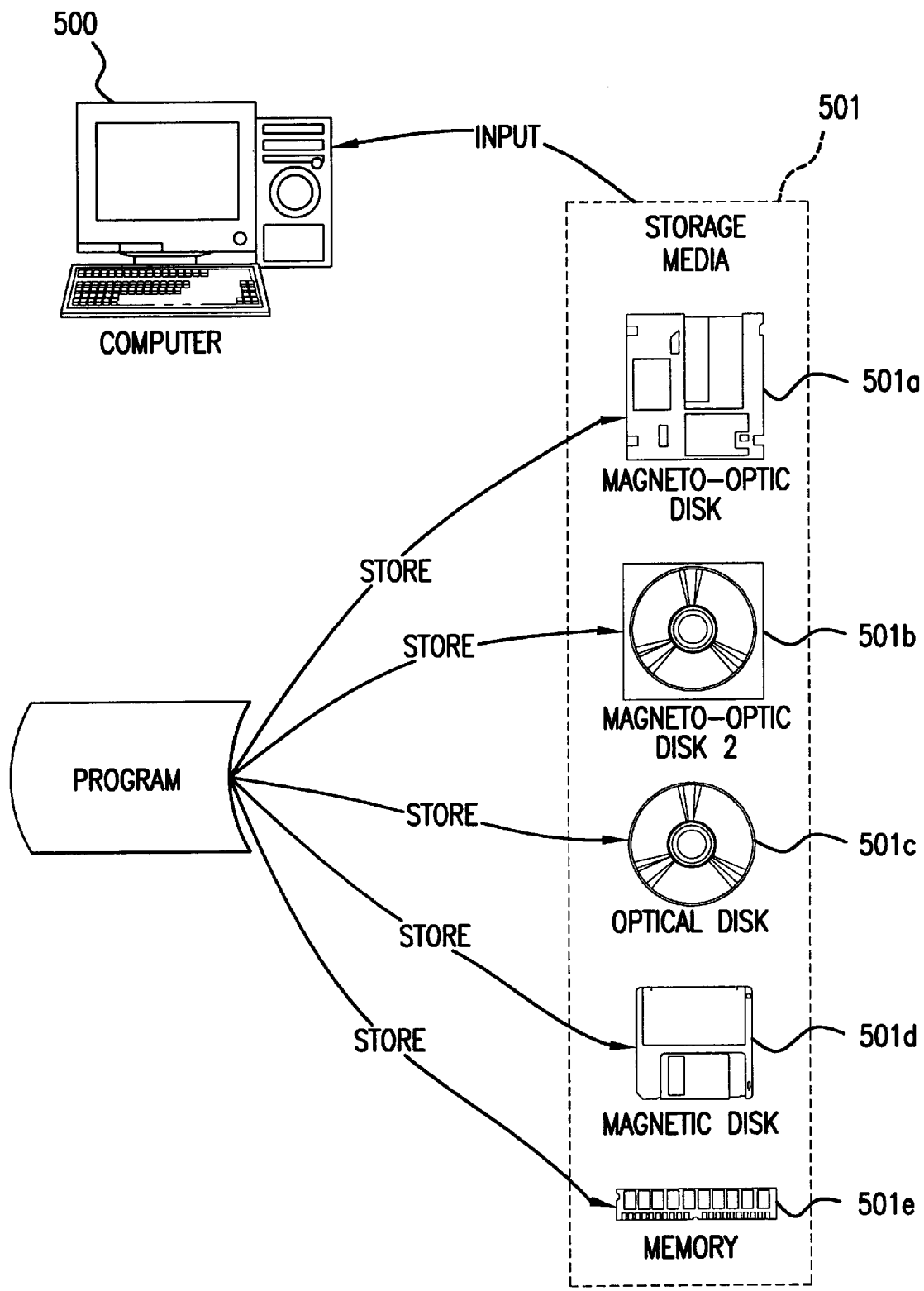
FIG. 13 is an illustration to show how a program is transmitted through a network.
Figure 15:
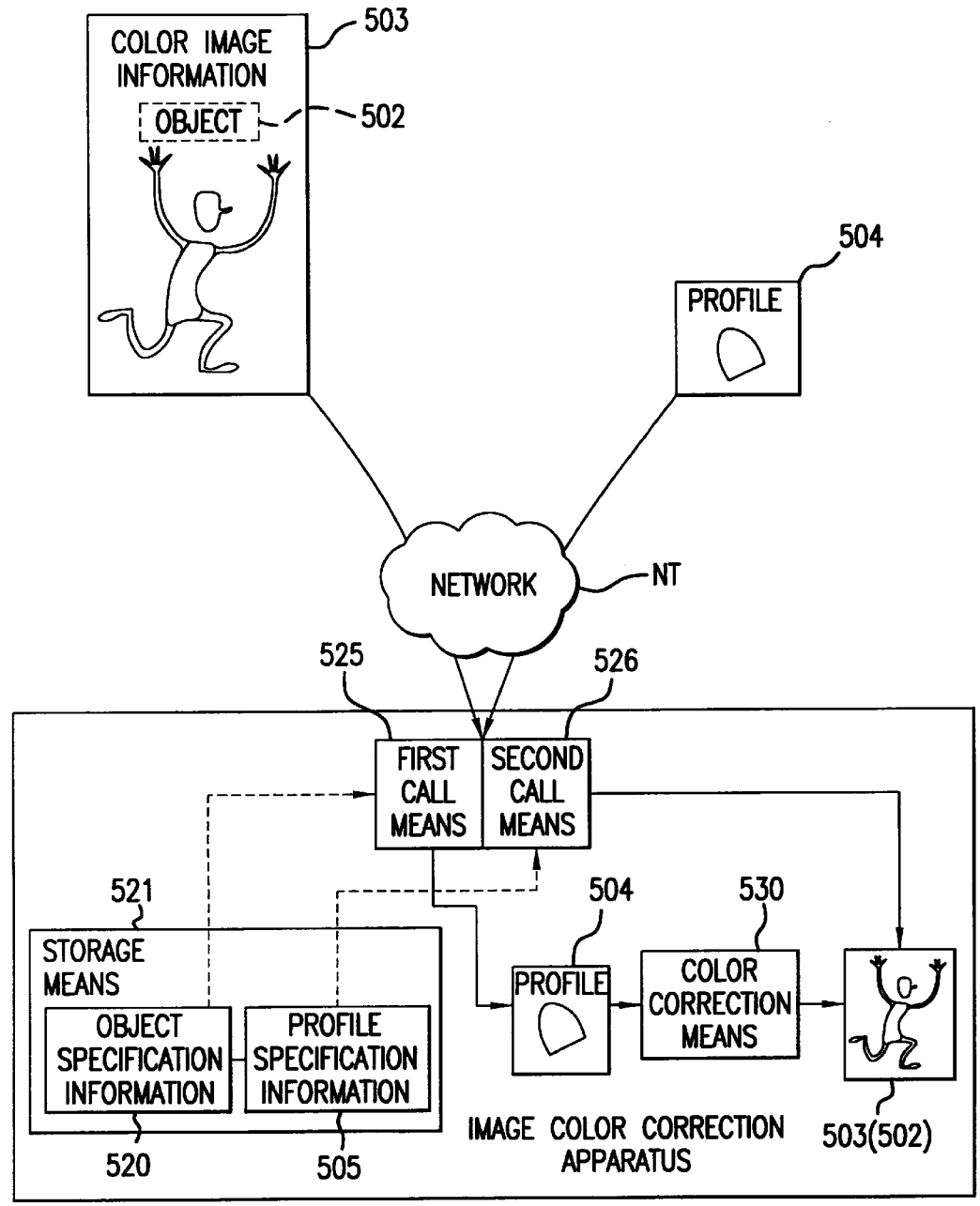
FIG. 15 is an illustration to show the configuration of an image color correction apparatus.
Figure 17:
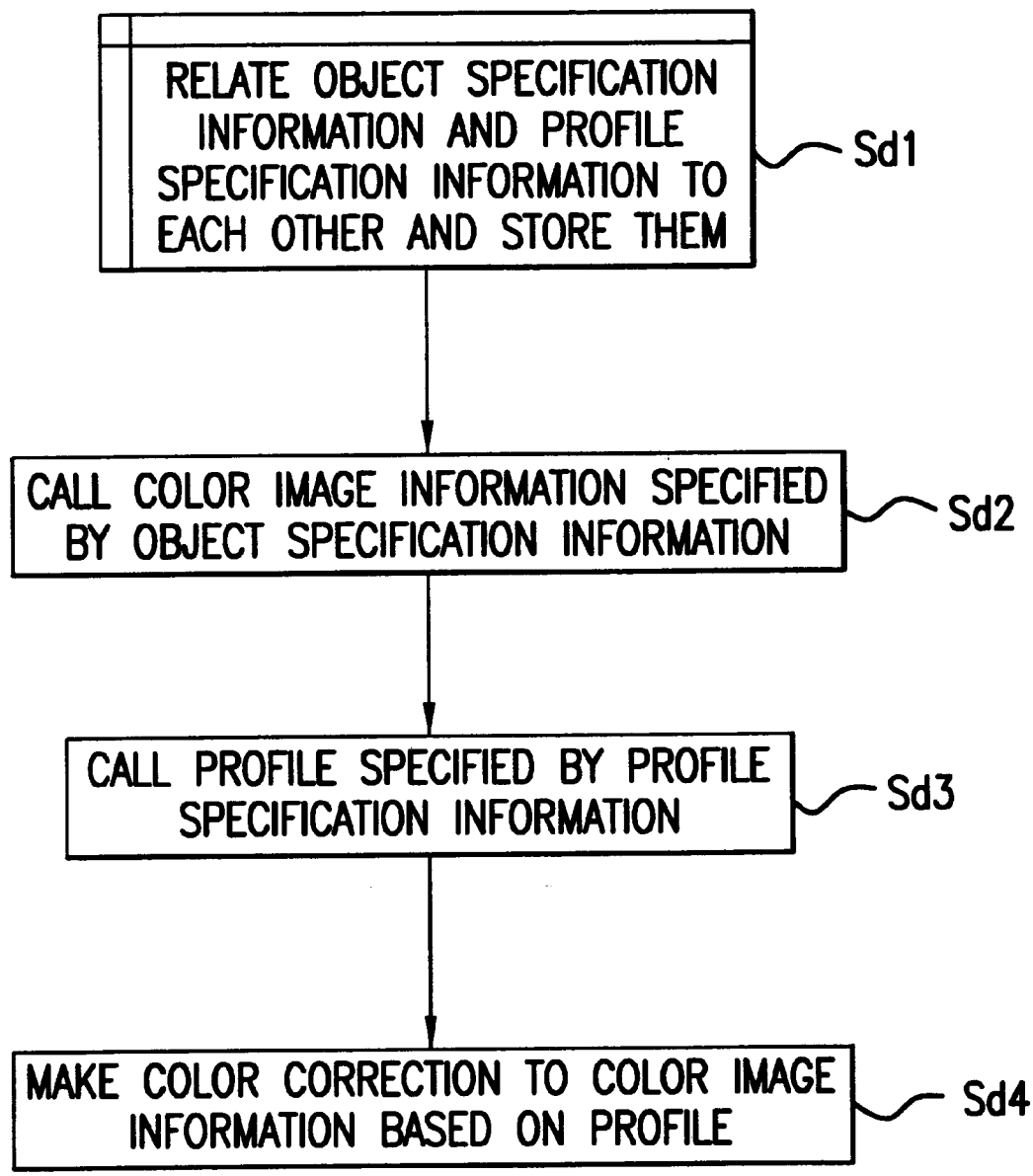
FIG. 17 is a flowchart provided by simplifying the flowchart shown in FIG. 6.

To solve such a problem, improvements are made to an image transmission/reception apparatus in existing WWWs as shown in FIG. 15. The improved apparatus relates color image information or object information preparing color image information to profile specification information, stores them in a format like HTML documents, calls the information as required through a network, and uses the called profile information to make a color correction to the called color image information, etc. FIG. 17 is a flowchart of the processing. The processing represented by the flowchart as shown in FIG. 17 can be described as a program, which can be stored on storage media for distribution, as shown in FIG. 13. Such a program can also be transmitted for distribution through a network, as shown in FIG. 12.

FIG. 2 shows the configuration of such an improved apparatus in more detail. Next, the first embodiment will be discussed in detail with reference to FIG. 2.

a. A profile server 200 is installed aside from a WWW server 100 for providing documents and images for a WWW browser 300 and provides a profile in response to a request from the WWW browser 300.

b. The WWW server 100 does not add the profile itself to a document or an image and describes profile specification information, specifically the location on the network where the profile exists, namely, information specifying the profile server storing the profile and the location of the profile in the profile server in the URL format and adds the profile specification information (URL) to the document or image.

c. When receiving the document or image to which the URL is added from the WWW server 100, the WWW browser 300 requests the profile server 200 to send the profile required for color correction based on the URL.

In doing so, at least the WWW server 100 is released from the load of transferring the profile itself to the WWW browser 300. Thus, the communication line usage rate of the WWW server 100 can be decreased as much as the required traffic for transferring the profile.

On the other hand, the WWW browser 300 can receive the necessary profile from the profile server 200 based on the URL provided by the WWW server 100, so that color correction is made to the document or image without any trouble. If the same URL as specified in the past is specified, it is considered that the same profile is specified, of course. Therefore, for example, profiles together with the URLs thereof are stored in the WWW browser 300 and when the same URL is received from the WWW server 100, the WWW browser 300 can reuse the profile stored corresponding to the URL, whereby fruitless communication can also be avoided in the WWW browser 300.

If profiles can be specified by information other than locations in the color image transfer apparatus according to the embodiment, such information may be used instead of the locations. For example, if headers are assigned to profiles in a unified manner in the color image transfer apparatus for uniquely specifying the profiles, such headers may be used instead of the locations. However, to use such headers, it becomes necessary to provide the system with a table for managing the correspondence between the profiles specified by the headers and the storage locations of the profiles in the system.

B. Second Embodiment

Figure 4:
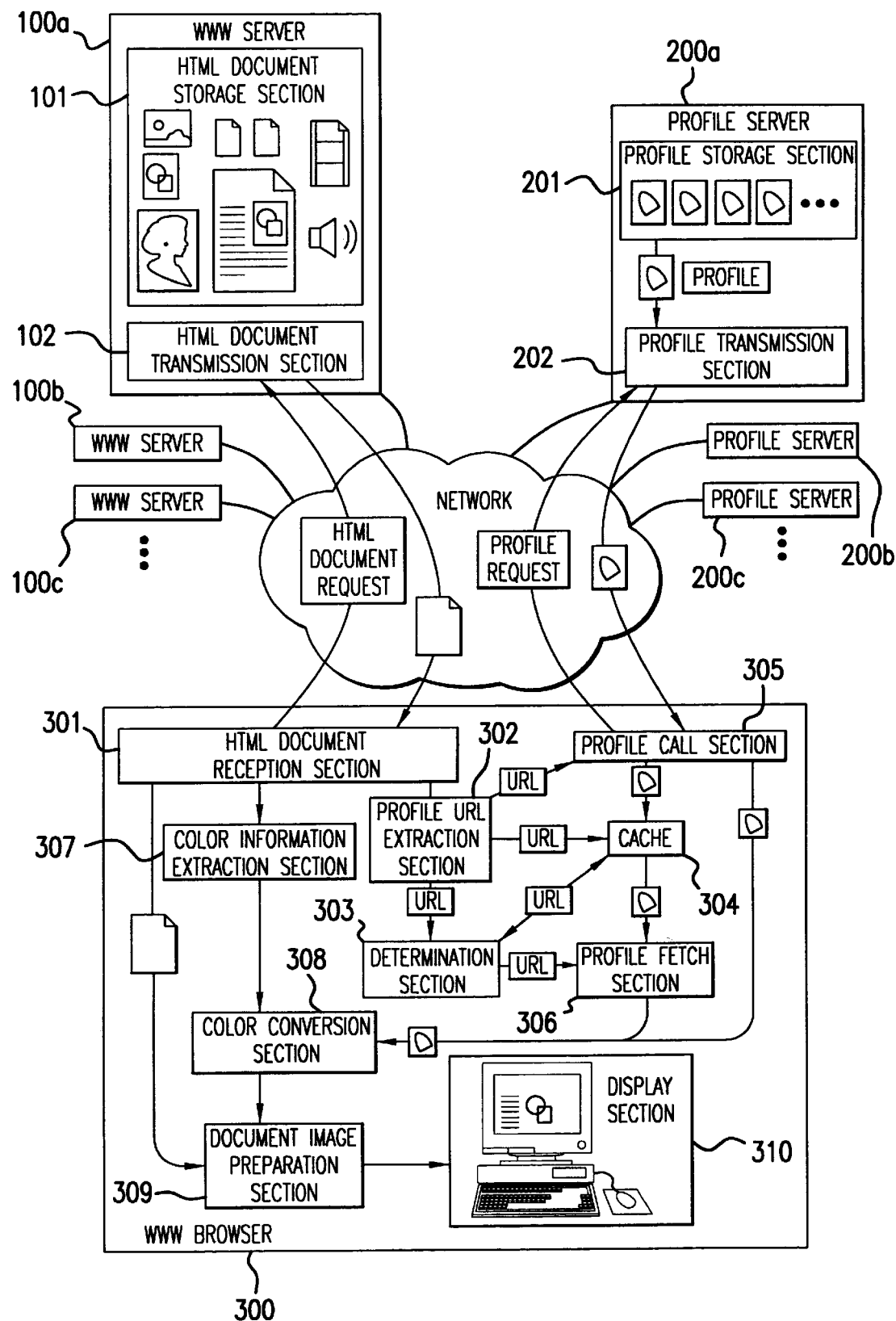
FIG. 4 is an illustration to show the configuration of an image transfer apparatus of a second embodiment of the invention.

FIG. 4 is an illustration to show the configuration of a color image transfer apparatus of a second embodiment of the invention. The second embodiment introduces a cache storage technique into a WWW browser of a receiving party for reducing fruitless communication.

In the example shown in FIG. 4, the user uses a WWW browser 300 to reference documents stored in WWW servers 100*a*, 100*b*, 100*c*, etc., connected to a network. The color spaces of the documents and images stored in the WWW servers are defined by profiles stored in profile servers 200*a*, 200*b*, 200*c*, etc., connected to the network.

In the WWW server 100*a* shown in FIG. 4, an HTML document storage section 101 stores HTML documents and data embedded in the documents. Such data includes images, moving pictures, voice, objects, programs, etc. All locations of the documents and data stored in the HTML document storage section 101 can be specified uniquely by URLs. When a request for transmitting an HTML document and its attached data comes through the network, an HTML document transmission section 102 transmits the requested document and data to the requester. The WWW server 100*b*, 100*c*, etc., has a similar configuration to that of the WWW server 100*a*.

In the profile server 200*a*, a profile storage section 201 stores profiles. All locations of the profiles stored in the profile storage section 201 can also be specified uniquely by URLs. When a request for transmitting a profile comes through the network, a profile transmission section 202 transmits the requested profile to the requester. The profile server 200*b*, 200*c*, etc., has a similar configuration to that of the profile server 200*a*.

In the WWW browser 300, an HTML document reception section 301 requests through the network a given server to send the HTML document indicated by the URL specified by the user and data attached to the HTML document. A profile URL extraction section 302 searches the HTML document received by the HTML document reception section 301 for a tag specifying a profile and extracts the URL pointing to the profile. A determination section 303 searches a cache 304 and determines whether or not the URL extracted by the profile URL extraction section 302 already exists in the cache 304, namely, whether the URL is previously received and the profile corresponding to the URL is stored in the cache 304. The cache 304 stores the profiles received by a profile call section 305 and the URLs of the profiles in pairs. If the profile is not stored in the cache 304, the profile call section 305 requests the corresponding server to send the profile through the network. A profile fetch section 306 fetches the profile corresponding to the specified URL from the cache 304.

A color information extraction section 307 extracts color information and color images from the HTML document received by the HTML document reception section 301. A color conversion section 308 uses the profile gotten by the profile call section 305 or the profile fetch section 306 to convert the color information and color images extracted by the color information extraction section 307 into the color space used in a display section 310. A document image preparation section 309 converts the HTML document into the format that can be understood by human beings by using the color space into which the color information and color images are converted by the color conversion section 308. The display section 310 displays the document image prepared by the document image preparation section 309 for the user.

In the second embodiment, some extensions are added to the HTML notation. Next, the extensions will be discussed.

The HTML document is described by embedding specifically defined marks called tags in a simple text. The tags can specify a document structure, a document display method, locations of images, moving pictures, voice, objects, programs, etc., embedded in the document, a link pointing to another document, comments, etc. The tag is described as a character string enclosed in angle brackets "<>" and a name indicating the tag type and attributes used by the tag are contained in "<>." For example, the attributes include character size, character style, locations of colors, images, etc., the URL of the document pointed to by a link, etc.

Figure 7:
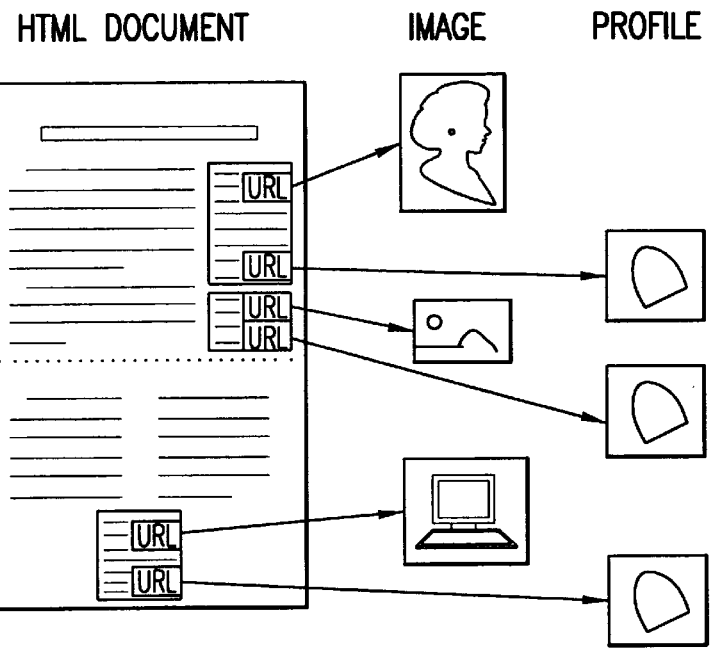
FIG. 7 is an illustration to show positions where URLs are embedded in the second embodiment of the invention.

In the embodiment, the HTML notation is extended in order to indicate the locations of the profiles of color information and color images in the HTML documents. In the extended HTML notation, as shown in FIG. 7, the URLs indicating images, color space types, and the URLs specifying profiles are embedded in a document. Thus, tags specifying color spaces used by documents, images, objects, etc., and profile URLs are provided. A use example will be discussed with reference to FIG. 5.

First, a <BODY> tag representing the beginning of a document body specifies a COLORSPACE attribute specifying a color space and a PROFILE attribute specifying the profile URL. These two attributes are added in the embodiment. The portion enclosed in the <BODY> tag and a </BODY> tag is the document body. When a tag specifying a color or image display appears between the <BODY> and </BODY> tags, if a color space or a profile is not specified, the color space and profile specified in the tag are used.

An attribute in a tag specifying a color and image display can also be used to specify a color space or a profile. In this case, the color space or profile specified in the attribute is used in the scope of the tag. In FIG. 5, in a tag <IMG> specifying display of image "digital-x.img," COLORSPACE and PROFILE attributes are used to specify a color space and a profile.

Further, <BLOCK> and </BLOCK> tags are added in order to specify a color space and a profile for a specific area of the document. COLORSPACE and PROFILE attributes specified in the <BLOCK> tag are applied only if another color space or profile is not specified in the area between the <BLOCK> and </BLOCK> tags. In FIG. 5, the tags are used to change the color space to CMYK and specify an appropriate profile at an intermediate point.

In the example in FIG. 5, both the color space and the profile are specified as attributes. However, if a color space is defined in a profile, a color space need not be specified as an attribute. For images, color space information may be embedded in the image depending on the format. Also in this case, a color space need not be specified as an attribute.

Of course, if tags to specify a color space or a profile exist in addition to the tags shown in FIG. 5, attribute specification may also be made in the tags. For example, executable objects for preparing characters, color moving pictures, and color images are named.

Figure 6:
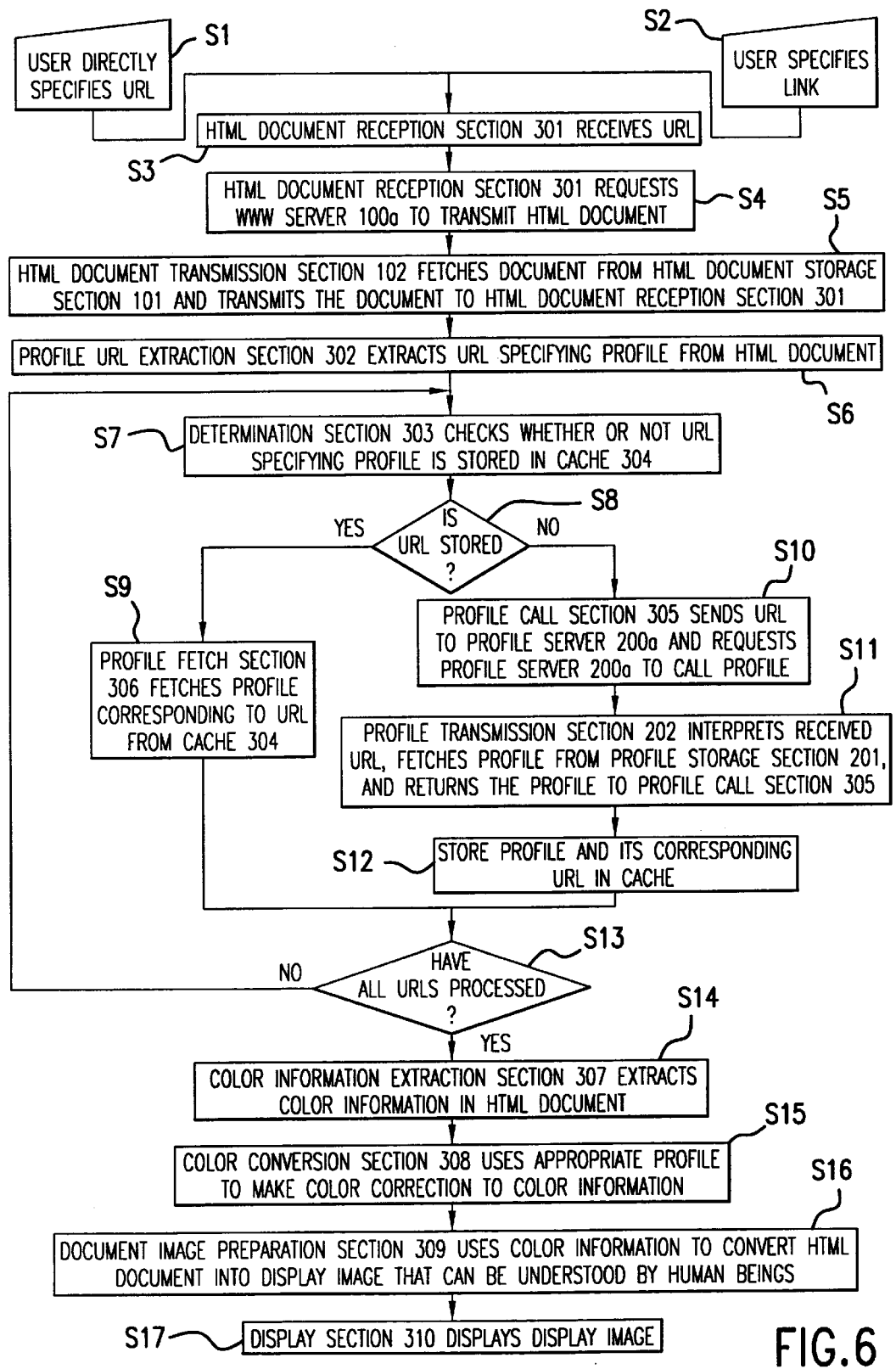
FIG. 6 is a flowchart to show the operation of the second embodiment of the invention.

Next, how such an extended HTML document is processed will be discussed with reference to the block diagram shown in FIG. 4 and a flowchart shown in FIG. 6.

When the user requests the WWW browser 300 to display an HTML document existing in a specific WWW server, the URL specifying the location where the HTML document exists is passed to the WWW browser 300. To give the URL, the user directly specifies the URL or specifies a link to the HTML document. Here, assume that the user requests the WWW browser 300 to display an HTML document stored in the WWW server 100a at step S1 or S2.

In the WWW browser 300, the received URL is passed to the HTML document reception section 301 at step S3.

The HTML document reception section 301 interprets the received URL and gets the address of the specified WWW server (in this case, 100a), then sends the URL to the WWW server 100a through the network and requests the WWW server 100a to transmit the HTML document specified by the URL at step S4.

In the WWW server 100a, the HTML document transmission section 102 receives the transmission request from the HTML document reception section 301. It interprets the received URL, knows where the requested HTML document exists in the HTML document storage section 101, fetches the HTML document from the HTML document storage section 101, and returns the HTML document to the HTML document reception section 301 of the WWW browser 300 through the network. The HTML document reception section 301 also finds the URL and the address of data of images, voice, etc., embedded in an HTML document and requests an appropriate WWW server to send the data through the network. Also in this case, the HTML document transmission section 102 of the WWW server receives the request, determines the data storage location from the URL and address, fetches the data from the HTML document storage section 101, and returns the data to the HTML document reception section 301 through the network at step S5.

In the WWW browser 300, the HTML document reception section 301 receives the HTML document thus returned. If the HTML document contains the attribute specifying a profile, the profile URL extraction section 302 extracts the URL specifying the profile at step S6. If the profile specification attribute does not exist, the WWW browser 300 performs normal processing although the step is not shown in the flowchart.

The extracted URL is sent to the determination section 303, which then searches the cache 304 and checks whether or not the extracted URL is stored in the cache 304 at step S7.

If the extracted URL is stored in the cache 304 at step S8, it is determined that the profile existing in the URL is already received, and the profile fetch section 306 fetches the profile corresponding to the URL from the cache 304 at step S9.

If the extracted URL is not stored in the cache 304, the profile call section 305 interprets the URL and determines the profile server storing the profile (in this case, profile server 200a). It sends the URL to the profile server 200a through the network and requests the profile server 200a to call the corresponding profile.

In the profile server 200a, the profile transmission section 202 receives the call request from the profile call section 305. It interprets the received URL, finds where the requested profile exists in the profile storage section 201, fetches the profile from the profile storage section 201, and returns the profile to the profile call section 305 of the WWW browser 300 through the network at step S11. Then, the profile received by the profile call section 305 from the profile server 200a and the URL extracted by the profile URL extraction section 302 are stored in the cache 304 at step S12.

The profile corresponding to the URL extracted by the profile URL extraction section 302 is thus provided by the profile fetch section 306 or the profile call section 305. After this, steps S7 to S12 are repeated for all URLs extracted by the profile URL extraction section 302 at step.

If it is determined at step S13 that all URLs have been processed, then the color information extraction section 307 extracts color information in the HTML document received by the HTML document reception section 301 (color values, color images, etc., specified by tags). At this time, information describing which profile is applied to which color information is also extracted at step S14.

The color conversion section 308 uses an appropriate profile to make a color correction to the color information extracted by the color information extraction section 307. In fact, color matching is executed by using the profile provided by the profile fetch section 306 or the profile call section 305 as an input profile and the profile describing the color characteristics of the display section 310 as an output profile at step S15.

Last, the document image preparation section 309 uses the color information converted by the color conversion section 308 to convert the HTML document into such a display image that can be understood by human beings at step S16, and the display section 310 displays the display image at step S17.

The processing is performed each time the user makes a request for displaying a new HTML document.

Thus, an HTML document and images and objects embedded in the document can be distributed over the network for display with the original colors held. In the system, the profile required for document display needs to be transmitted to the browser only once, so that fruitless communication does not occur and the effective use of the network can be made. In the system, profiles can be gotten for making a color correction by the same method regardless of the number of servers storing HTML documents and profiles or the locations. Thus, a number of servers are provided as required, whereby traffic to the servers can be distributed.

C. Third Embodiment

Figure 8:
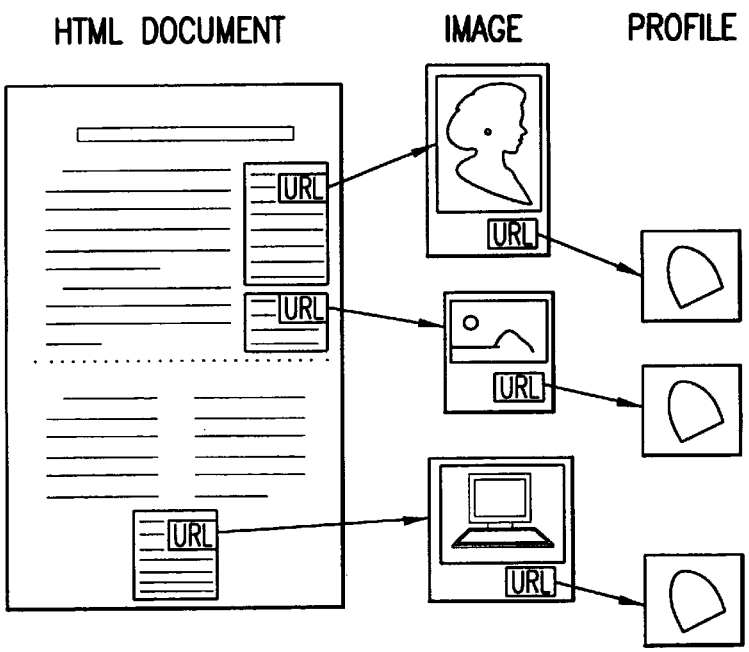
FIG. 8 is an illustration to show positions where URLs are embedded in a third embodiment of the invention.
Figure 9:
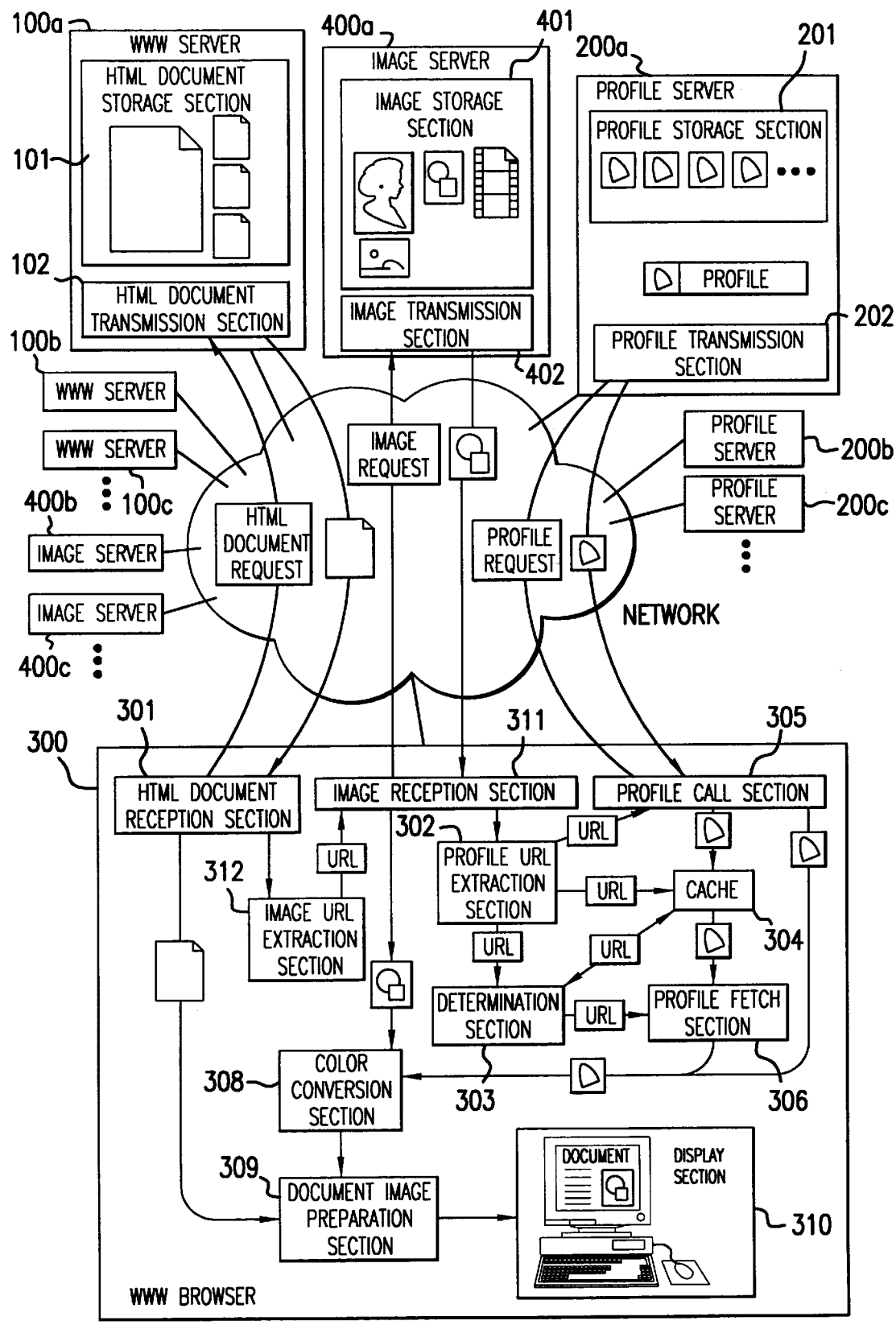
FIG. 9 is an illustration to show the configuration of an image transfer apparatus of the third embodiment of the invention.
Figure 11:
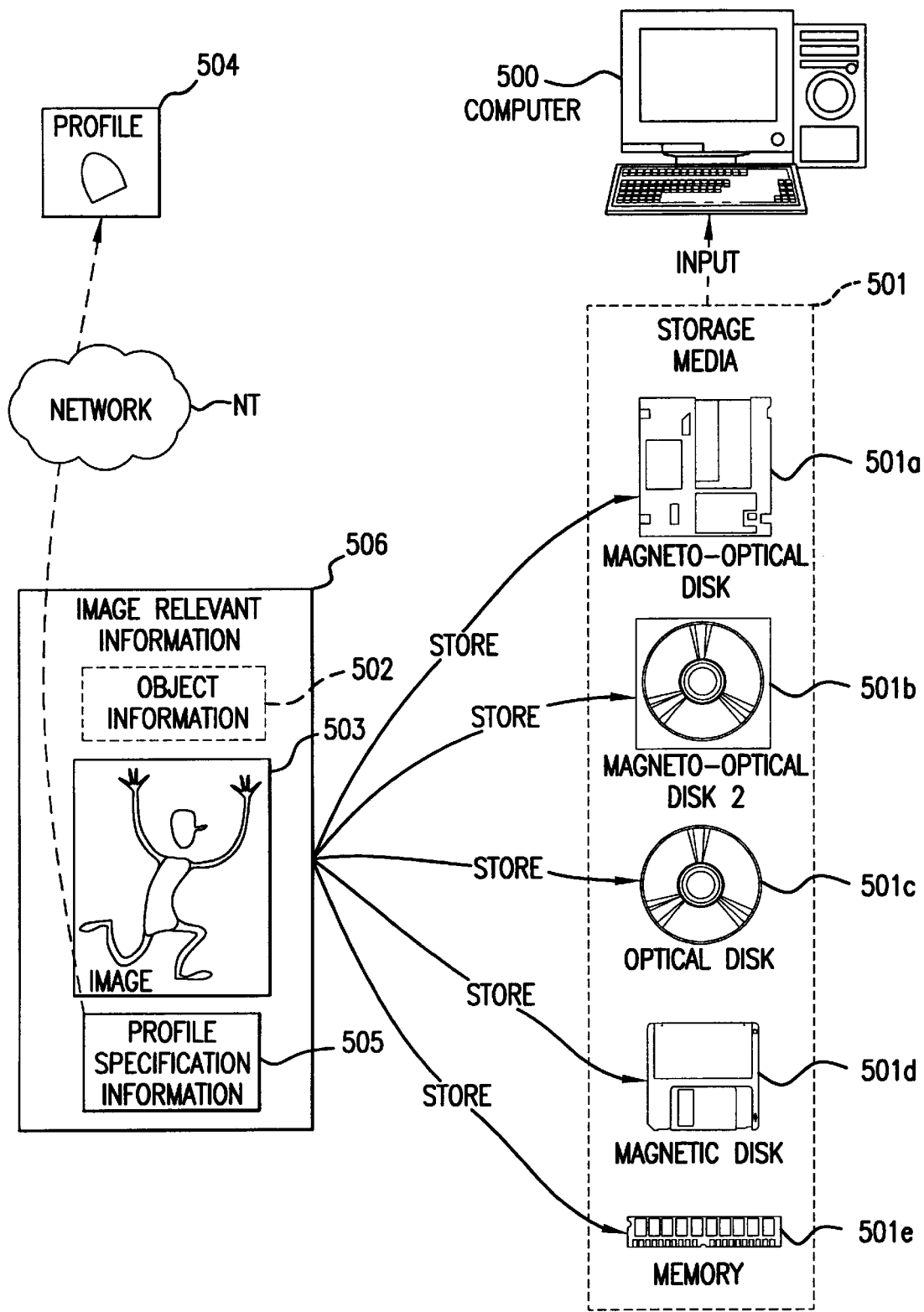
FIG. 11 is an illustration to show how image relevant information is stored on storage media.
Figure 14:
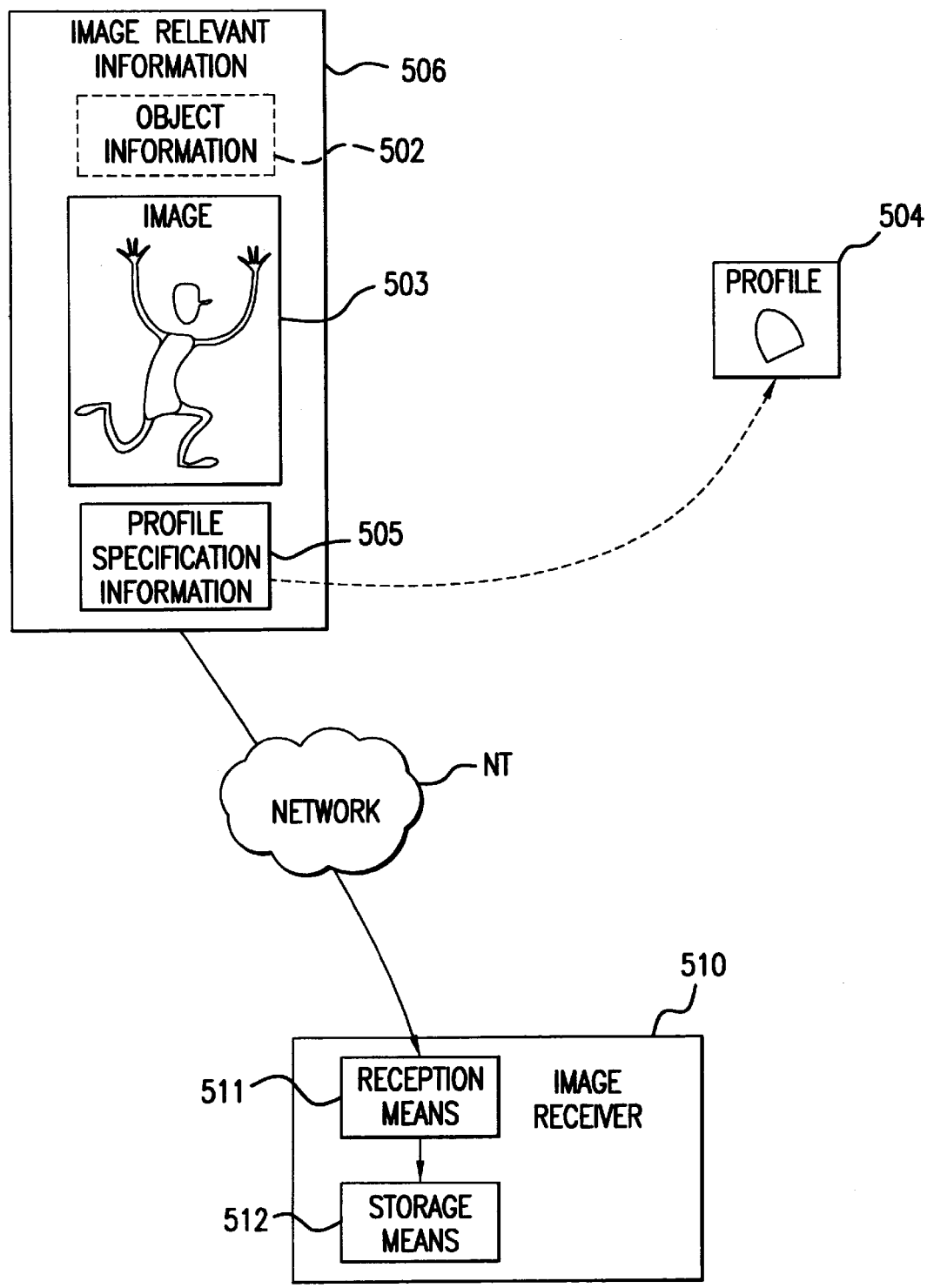
FIG. 14 is an illustration to show the configuration of an image receiver for receiving image relevant information.

FIG. 14 shows the configuration of an image color correction apparatus of a third embodiment of the invention. This configuration is described in FIG. 9 in more detail. The third embodiment does not embed a URL specifying a profile in an HTML document and describes profile specification information specifying a profile (for example, a URL) together with an image as shown in FIG. 8, thereby specifying profile information required for color correction of the image. FIG. 11 shows a concept of storing image relevant information comprising the image and profile specification information on storage media that can be read by computers. Storage of the image relevant information on the storage media as shown in the figure enables the image relevant information to be distributed with media rich in possibility and to be used in programs.

For a method of describing a URL specifying a profile in an image, generally an image file contains a header part describing the image size, color space, compression method, etc., thus the profile specification URL can be embedded by changing the header format. If a tag structure or a directory structure is adopted as a file internal structure as in TIFF and FlashPix, a tag, a new storage location, etc., for describing such a URL is provided, whereby the URL can be embedded.

Of course, a URL specifying a profile can be described not only for still images, but also for executable projects for preparing color moving pictures and color images.

Figure 10:
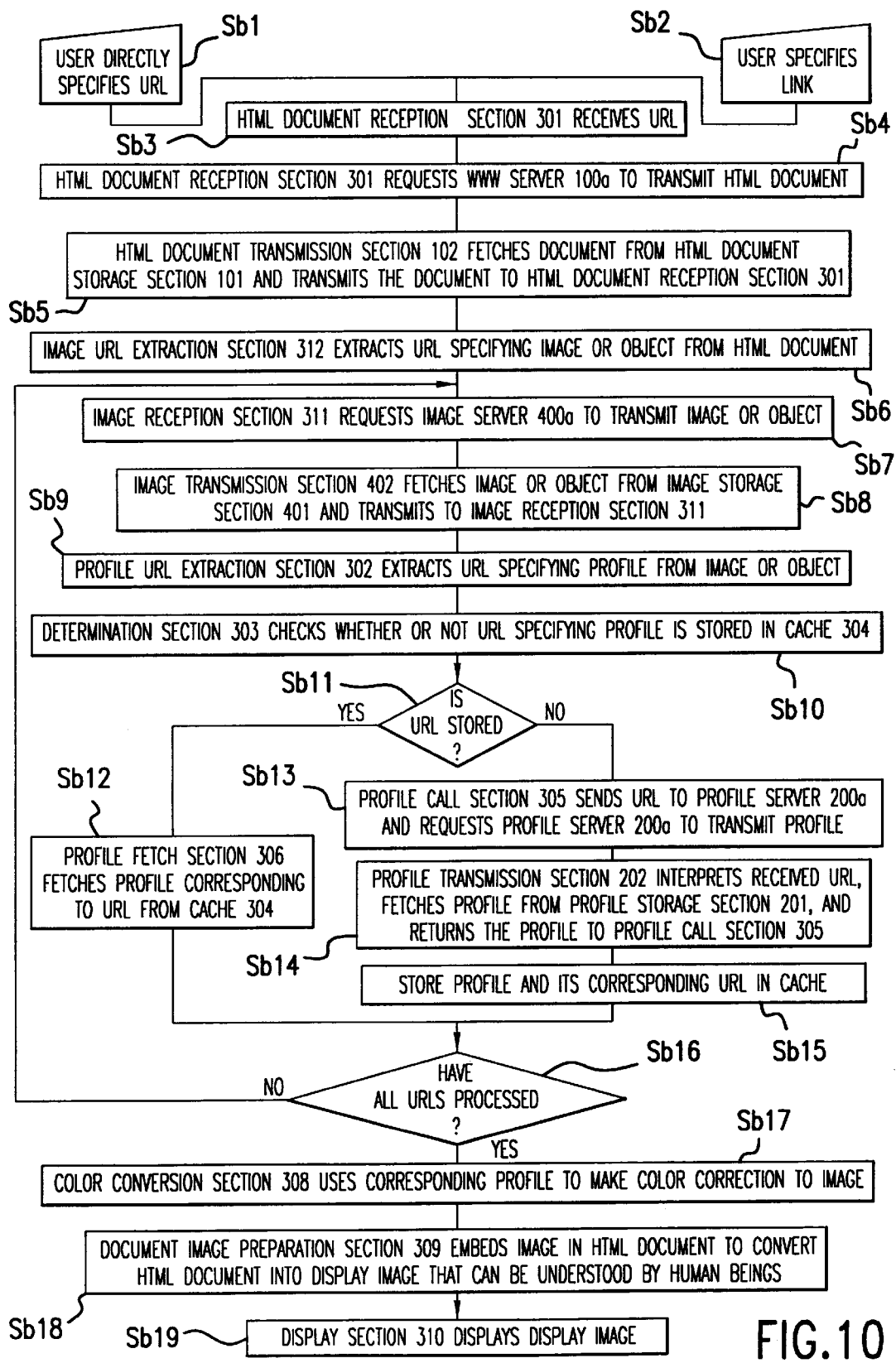
FIG. 10 is a flowchart to show the operation of the third embodiment of the invention.
Figure 16:
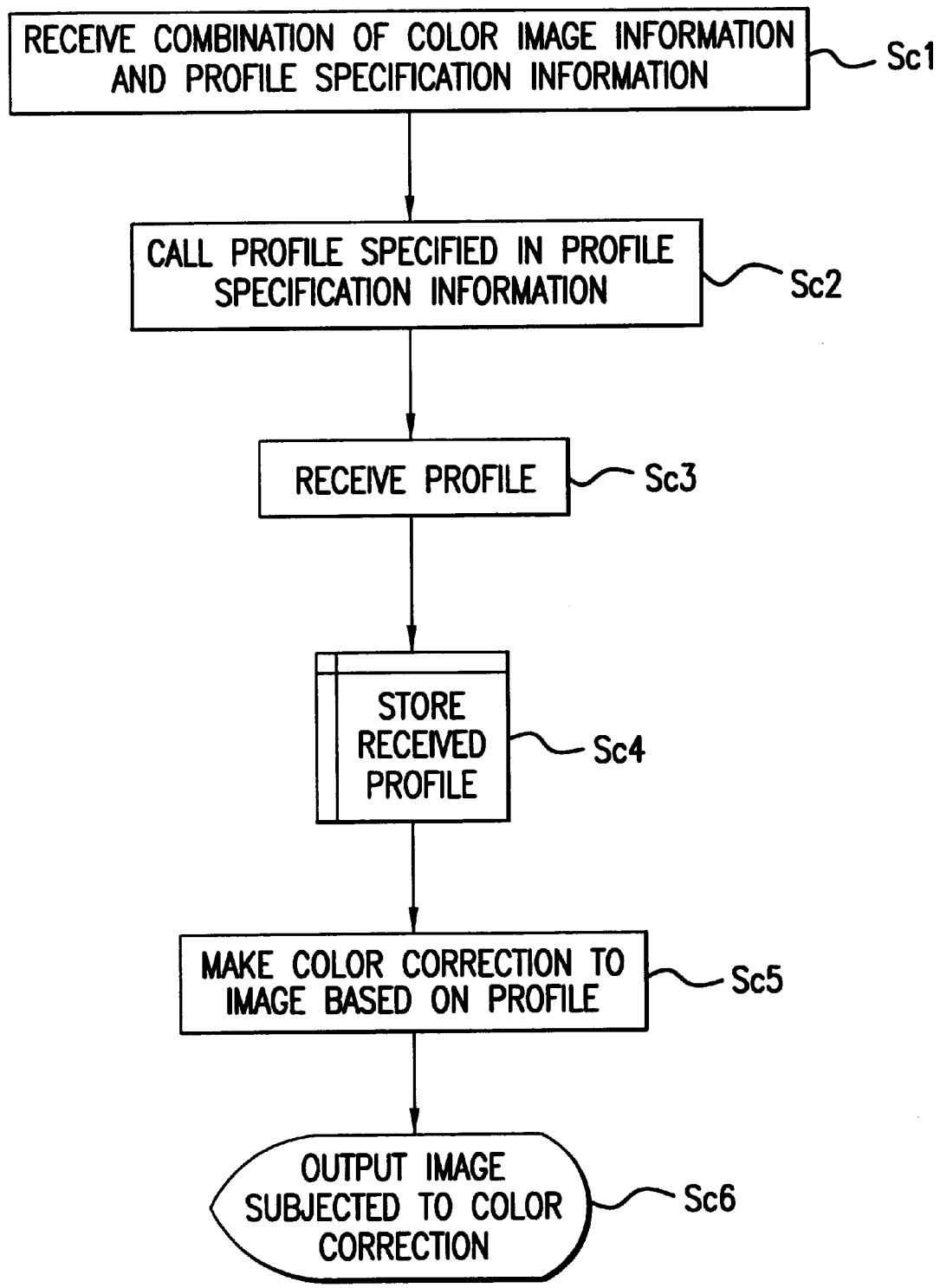
FIG. 16 is a flowchart provided by simplifying the flowchart shown in FIG. 10.

Next, how such an image is processed will be discussed. FIG. 16 is a flowchart to represent a processing flow. FIG. 10 describes the processing shown on the flowchart in more detail. A program can be described according to such a processing flow; such a processing program can be stored on storage media for distribution, as shown in FIG. 18. Such a program can also be transmitted through a network for distribution.

Subsequently, an actual processing flow will be discussed with reference to the flowchart in FIG. 10.

When the user requests a WWW browser 300 to display an HTML document existing in a specific WWW server, the URL specifying the location where the HTML document exists is passed to the WWW browser 300. To give the URL, the user directly specifies the URL or specifies a link to the HTML document. Here, assume that the user requests the WWW browser 300 to display an HTML document stored in a WWW server 100a at step Sb1 or Sb2.

In the WWW browser 300, the received URL is passed to an HTML document reception section 301 at step Sb3. The HTML document reception section 301 interprets the received URL and gets the address of the specified WWW server (in this case, 100a), then sends the URL to the WWW server 100a through the network and requests the WWW server 100a to transmit the HTML document specified by the URL at step Sb4.

In the WWW server 100a, an HTML document transmission section 102 receives the transmission request from the HTML document reception section 301. It interprets the received URL, finds where the requested HTML document exists in an HTML document storage section 101, reads the HTML document, and returns the read HTML document to the HTML document reception section 301 of the WWW browser 300 through the network at step Sb5.

Next, an image URL extraction section 312 extracts the URL of an image embedded in the HTML document returned to the HTML document reception section 301 and transfers the image URL to the HTML document reception section 301 at step Sb6.

On the other hand, the HTML document reception section 301 interprets the URL received from the image URL extraction section 312 and requests an appropriate server to send the image through the network. Here, as an example, assuming that the image existing in an image server 400a is requested, an image transmission section 402 of the image server 400a receives the request from the image reception section 311 at step Sb7. The image transmission section 402 interprets the URL and checks where the requested image exists in an image storage section 401. It reads the image and returns the read image to the image reception section of the WWW browser 300 through the network at step Sb8.

If the image contains the URL specifying a profile, the profile URL extraction section 302 extracts the URL at step Sb9. If the profile specification URL does not exist, the WWW browser 300 performs normal processing although the step is not shown in the flowchart.

The URL thus extracted is sent to a determination section 303, which then searches a cache 304 and checks whether or not the extracted URL is stored in the cache 304 at step Sb10.

If the extracted URL is stored in the cache 304 at step Sb11, the profile corresponding to the URL is already received and need not be read from a profile server. In this case, a profile fetch section 306 fetches the profile corresponding to the URL from the cache 304 at step Sb12.

On the other hand, if the URL extracted at step Sb9 is not stored in the cache 304, a profile call section 305 interprets the URL and determines the profile server storing the profile. If a profile server 200a is specified as an example, the profile call section 305 sends the URL to the profile server 200a and requests the profile server 200a to call the profile at step Sb13.

A profile transmission section 202 of the profile server 200a receives the call request from the profile call section 305. It interprets the received URL, finds where the requested profile exists in a profile storage section 201, fetches the profile, and returns the profile to the profile call section 305 of the WWW browser 300 through the network at step Sb14.

Then, the profile received by the profile call section 305 from the profile server 200a and the URL extracted by the profile URL extraction section 302 are stored in the cache 304 at step Sb15.

The profile corresponding to the URL extracted by the profile URL extraction section 302 is thus provided by the profile fetch section 306 or the profile call section 305.

Steps Sb7 to Sb15 are repeated for all URLs extracted by the image URL extraction section 312.

If it is determined at step Sb16 that all URLs have been processed, then a color conversion section 308 uses an appropriate profile to make a color correction to the color information extracted by the color information extraction section 307. In fact, color matching is executed by using the profile provided by the profile fetch section 306 or the profile call section 305 as an input profile and the profile describing the color characteristics of a display section 310 as an output profile at step Sb17.

Last, a document image preparation section 309 uses the color information converted by the color conversion section 308 to convert the HTML document into such a display image that can be understood by human beings at step Sb18, and the display section 310 displays the display image at step Sb19.

The processing is performed each time the user makes a request for displaying a new HTML document.

In the third embodiment, the URL specifying a profile can be specified without extending the HTML format in the second embodiment. The profile specified by the URL is used to execute color conversion, whereby images and objects can be distributed over the network for display with the original colors held.

Since information concerning the profile corresponding to an image file is embedded, the corresponding image and profile can be managed in a unified manner and management of images and profiles is facilitated.

The second and third embodiments can also be combined in such a manner that the third embodiment is applied to images and objects containing the URL specifying a profile and that the second embodiment is applied to images and objects not containing any URL and color values specified directly in HTML documents.

D. Modified Examples (1) In the embodiment, we have discussed the WWW servers, the profile servers, the WWW browsers, and the image servers as different machines, but the functions equivalent to two or more types of machines may be installed in one machine. In the example, the user specifies a URL from the beginning for requesting an HTML document to be displayed. However, if the WWW server prepares an HTML document dynamically, the HTML document can also be displayed by performing similar processing.

(2) The invention can be applied to networks of various sizes from world-wide networks like the Internet to in-house LANs (local area networks).

A color correction can also be made to color documents other than HTML documents by a similar method by adding means for describing locations of profiles. Available as examples of such documents are document format PDF (portable document format) developed by Adobe Systems Corporation, format VRML for describing three-dimensional images, and the like.

(3) The processing contents in the first, second, or third embodiment can be represented by a program that can be executed by computers, and the program can be stored on storage media for use. (See FIG. 13.) Further, the program may be transferred through a network. In this case, storage means having an area for storing the program and transmission means for reading the program from the storage area and sending the program may be provided. (See FIG. 12.)

A color image or an object for preparing a color image and profile specification information specifying a profile corresponding to the image or an image prepared by the object can also be stored on a storage medium in a pair for use. (See FIG. 11.) That is, the color images, profile specification information, etc., can be used not only through a network, but also with storage media.

(4) In the first to third embodiments, a color image or an object for preparing a color image and profile specification information specifying a profile corresponding to the image or an image prepared by the object may be received in a pair through a network, stored on a storage medium such as hard disk, then used. (See FIGS. 14 and 15.)

As we have discussed, according to the invention, color image information or object information for preparing color image information is transferred without putting a large load on a specific transmitter or executing fruitless communication on a network and the receiving party can reproduce an image with original image colors held.

For color image information or object information for preparing color image information stored on storage media, an image can also be reproduced with original image colors held in a similar manner to that described above.

What is claimed is:

1. An image transfer apparatus comprising:

profile storage means being connected to a network, for storing profile information for a color correction made to color image information or color image information prepared from object information;

image transmission means for transmitting profile specification information specifying the profile information corresponding to the color image information or the object information together with the color image information or the object information; and image reception and reproduction means comprising;

means for receiving the color image information or the object information and the profile specification information transmitted by said image transmission means, means for calling profile information specified by the profile specification information received by said reception means from said profile storage means, color correction means using the profile information for making a color correction to the color image information or color image information prepared from the object information, and means for reproducing the color image information to which a color correction has been made by said color correction means.

2. The image transfer apparatus of claim 1, wherein the profile information is information defining a color space used to describe the color image information or color image information prepared from the object information.

3. The image transfer apparatus of claim 1, wherein the profile specification information is location information specifying a location of storage means on the network where the profile information exists, and a storage location of the profile information in said storage means.

4. An image transmitter comprising:

means for transmitting through a network, color image information or object information for preparing color image information, and profile specification information specifying profile information for a color correction made to the color image information or color image information prepared from the object information.

5. A profile information transmitter comprising:

profile storage means for storing profile information for a color correction made to color image information or color image information prepared from object information; and communication control means for transmitting the profile information to a calling party when the profile information is called through a network.

6. An image receiver/reproducer comprising:

means for receiving color image information or object information for preparing color image information, and profile specification information specifying profile information for a color correction made to the color image information or color image information prepared from the object information, sent through a network;

means for calling through the network, profile information corresponding to the profile specification information received by said reception means;

color correction means using the profile information for making a color correction to the color image information or color image information prepared from the object information; and means for reproducing the color image information to which a color correction has been made by said color correction means.

7. An image receiver/reproducer comprising:

means for receiving color image information or object information for preparing color image information and profile specification information specifying profile information for a color correction made to the color image information or color image information prepared from the object information, sent through a network;

means for registering profile information received through the network together with the profile specification information for specifying the profile information;

means for determining whether or not the same information as the profile specification information received by said reception means is registered in said registration means;

means for getting profile information corresponding to the profile specification information from said registration means if a determination that the same information as the profile specification information received by said reception means is registered in said registration means is obtained from said determination means;

means for calling profile information through the network if a determination that the same information as the profile specification information received by said reception means is not registered in said registration means is obtained from said determination means;

color correction means using the profile information obtained by said getting means or said call means for making a color correction to the color image information or color image information prepared from the object information; and means for reproducing the color image information to which a color correction has been made by said color correction means.

8. A storage medium for storing data accessed by a program executed by a computer, and having a predetermined data structure in a format that can be input thereto, wherein said storage medium stores color image information or object information for preparing color image information, and profile specification information for specifying profile information for a color correction made to the color image information or color image information prepared from the object information in relation to each other.

9. The storage medium of claim 8, wherein the profile information is information defining a color space used to describe the color image information or color image information prepared from the object information.

10. An image receiver comprising:

means for receiving image relevant information consisting of color image information or object information for preparing color image information, and profile specification information for specifying profile information for a color correction made to the color image information or color image information prepared from the object information; and means for storing the image relevant information received by said reception means.

11. A program transmitter comprising:

means for storing a program for causing a computer to perform; and transmission means for reading the program stored in said storage means and transmitting the program, wherein the steps of:

receiving color image information or object information for preparing color image information, and profile specification information specifying profile information for a color correction made to the color image information or color image information prepared from the object information, sent through a network;

calling profile information corresponding to the profile specification information received in said reception step;

correcting color with using the profile information called in said calling step for making a color correction to the color image information or color image information prepared from the object information; and reproducing the color image information to which a color correction has been made in said color correction step, are performed.

12. A storage medium for storing a program for causing a computer to perform the steps of:

receiving color image information or object information for preparing color image information and profile specification information specifying profile information for a color correction made to the color image information or color image information prepared from the object information, sent through a network;

calling profile information corresponding to the profile specification information received in said reception step;

correction color with using the profile information called in said calling step for making a color correction to the color image information or color image information prepared from the object information; and reproducing the color image information to which a color correction has been made in said color correction step, in a format that can be input to said computer.

13. An image color correction apparatus comprising:

means for storing object specification information specifying color image information or object information for preparing color image information, and profile specification information for specifying profile information for a color correction made to the color image information or color image information prepared from the object information specified by the object specification information in relation to each other;

first call means for calling the color image information or object information corresponding to the object specification information stored in said storage means;

second call means for calling the profile information corresponding to the profile specification information stored in said storage means in relation to the color image information or object information called by said first call means; and color correction means using the profile information called by said second call means for making a color correction to the color image information or color image information prepared from the object information called by said first call means.

14. A storage medium for storing a program for causing a computer to perform the steps of:

storing object specification information specifying color image information or object information for preparing color image information, and profile specification information for specifying profile information for a color correction made to the color image information or color image information prepared from the object information specified by the object specification information in relation to each other;

a first call the color image information or object information corresponding to the object specification information stored in said storage step;

a second call the profile information corresponding to the profile specification information stored in said storage step in relation to the color image information or object information called in said first call step; and correcting color with using the profile information called in said second call step for making a color correction to the color image information or color image information prepared from the object information called in said first call step, in a format that can be input to said computer.

15. A program transmitter comprising:

means for storing a program for causing a computer to perform the steps of:

storing object specification information specifying color image information or object information for preparing color image information, and profile specification information for specifying profile information for a color correction made to the color image information or color image information prepared from the object information specified by the object specification information in relation to each other;

a first call the color image information or object information corresponding to the object specification information stored in said storage step;

a second call the profile information corresponding to the profile specification information stored in said storage step in relation to the color image information or object information called in said first call step; and correction color with using the profile information called in said second call step for making a color correction to the color image information or color image information prepared from the object information called in said first call step, in a format that can be input to said computer; and transmission means for reading the program stored in said storage means and transmitting the read program.

* * * * *